United States Patent [19]

Petek

[11] Patent Number: 5,259,487
[45] Date of Patent: Nov. 9, 1993

[54] ADJUSTABLE DAMPERS USING ELECTRORHEOLOGICAL FLUIDS

[75] Inventor: Nicholas Petek, Cleveland Heights, Ohio

[73] Assignee: The Lubrizol Corporation, Wickliffe, Ohio

[21] Appl. No.: 913,118

[22] Filed: Jul. 14, 1992

[51] Int. Cl.$^5$ .............................................. F16F 15/03
[52] U.S. Cl. .................... 188/267; 188/299; 188/315; 267/64.15
[58] Field of Search ............... 188/267, 299, 316, 317, 188/318, 322.15, 322.22, 281, 282, 314, 315, 268, 322.5; 267/140.14, 140.15, 64.15, 64.23, 64.27; 280/707

[56] References Cited

U.S. PATENT DOCUMENTS

| | | |
|---|---|---|
| 2,661,596 | 12/1953 | Winslow . |
| 3,207,269 | 9/1965 | Klass . |
| 4,819,772 | 4/1989 | Rubel . |
| 4,858,733 | 8/1989 | Noguchi et al. . |
| 5,000,299 | 3/1991 | Goto et al. . |
| 5,014,829 | 5/1991 | Hare . |
| 5,018,606 | 5/1991 | Carlson ................................. 188/267 |
| 5,029,677 | 7/1991 | Mitsui . |
| 5,076,403 | 12/1991 | Mitsui ................................. 188/267 |
| 5,161,653 | 11/1992 | Hare, Sr. ............................. 188/267 |

FOREIGN PATENT DOCUMENTS

| | | |
|---|---|---|
| 0183039 | 4/1986 | European Pat. Off. . |
| 0261427 | 3/1988 | European Pat. Off. . |
| 0478273 | 4/1992 | European Pat. Off. . |
| 3330205 | 3/1985 | Fed. Rep. of Germany . |
| 3631107 | 3/1988 | Fed. Rep. of Germany . |
| 3830836 | 3/1990 | Fed. Rep. of Germany . |
| 1282568 | 7/1972 | United Kingdom . |
| 2111171 | 6/1983 | United Kingdom . |

OTHER PUBLICATIONS

T. G. Duclos, "Design of Devices Using Electrorheological Fluids", Society of Automotive Engineers Paper No. 881134 (1988).

R. Stanway, J. Sproston, and X. Wu., "Variable Suspension Damping Using Electro-Rheological Fluids", Institution of Mechanical Engineers Paper No. C382/034 (SAE 894034) (1989).

K. H. Hagele, K. Engelsdorf, M. Mettner, M. Panther, Q. Ngoc Tran. E. Rubel, "Continuously Adjustable Shock Absorbers for Rapid-Acting Ride Control Systems (RCS)", Society of Automotive Engineers Paper No. 905125 (1990).

S. Morishita and J. Mitsui, "Controllable Shock Absorber System (An Application of Electro-Rheological Fluid)", Society of Automotive Engineers Paper NO. 910744 (1991).

Z. P. Shulman, B. M. Khusid, E. V. Korobko and E. P. Khizinsky, "Damping of Mechanical Systems Oscillations by a Non-Newtonian Fluid with Electric-Field Dependent Parameters", Journal of Non-Newtonian Fluid Mechanics (1987), vol. 25, pp. 329-346.

*Primary Examiner*—Douglas C. Butler
*Attorney, Agent, or Firm*—Fredrick D. Hunter; John H. Engelmann; Forrest L. Collins

[57] ABSTRACT

Adjustable dampers using electrorheological (ER) fluids comprise one or more annular ER fluid transfer ducts in fluid communication with fluid chambers on opposite sides of the damper pistons. Each duct has one or more contoured surfaces or bands along a portion of the length of one or both walls of the ducts providing one or more annular constricted working areas through which the ER fluid is forced when displaced by movement of the pistons. By selectively applying a voltage/electric field across the primary working areas, the flow resistance of the ER fluid passing through the primary working area is increased which increases the damping force of the dampers.

36 Claims, 4 Drawing Sheets

ADJUSTABLE DAMPERS USING ELECTRORHEOLOGICAL FLUIDS

FIELD OF THE INVENTION

This invention relates to electrorheological (ER) fluid dampers that provide electronically adjustable damping of a vibrating body.

BACKGROUND OF THE INVENTION

Dampers are used in vibration control applications to control resonance. One such application where dampers are commonly used is as a shock absorber for a vehicle suspension system designed to control ride and handling of a vehicle for the comfort and safety of its passengers.

There are several known types of suspension systems that have met with varying degrees of success. One such system is a conventional passive suspension, consisting of a passive spring and damper, which must compromise its ability to control a vehicle. Generally, low damping is preferred for good isolation of noise, vibration and harshness, whereas high damping is desired for control of body and wheel motion during cornering, acceleration and braking.

Another known type of suspension system is an adaptive suspension, which utilizes a passive spring and an adjustable damper with "slow" response to improve the control of ride and handling. The level of damping at all wheel positions can be selected by the driver, or it can be automatically tuned for variations in vehicle speed, steering angle, throttle position, brake pressure, or accelerometer signals.

Still another known type of suspension system is a semi-active suspension, which is similar to an adaptive suspension, except that the adjustable damper has "fast" response (less than 10 ms) and each wheel position is independently controlled in real time.

Yet another known type of suspension is a fully active suspension in which a hydraulic actuator is used in place of the damper to achieve better vehicle control but at a higher cost.

Theoretically, the performance of a semi-active suspension can approach that of a fully active suspension at a fraction of the cost. The preferred control algorithm, known as the "sky-hook" model, consists of a feed-back loop that adjusts damping level based on (1) the absolute vertical velocity of the vehicle body, and (2) the relative velocity between the body and the wheel.

A key component of this system is an adjustable damper with sufficiently fast response. One means of achieving variable damping is to use an electromechanical variable orifice to alter the flow resistance of a conventional hydraulic fluid. Another means is to use an electrically-charged fixed orifice to change the flow resistance of a field-responsive fluid such as electrorheological (ER) fluid.

The present invention relates to dampers that use suitable ER fluids for variable damping and which are intended ultimately to be incorporated in a semi-active suspension system. ER fluids, sometimes called "smart" fluids, are materials having flow properties that can be modified with electric field. This unique behavior may be utilized to adjust the damping force of dampers/shock absorbers with fast-acting electronic control by selectively applying voltage to the ER fluid.

Utilizing ER technology in damper applications offers advantages over conventional technology in that the ER effect is efficient, typically requiring only a few watts of electric power. Also, the damper construction is simplified due to the non-mechanical nature of ER technology, potentially decreasing manufacturing costs and increasing reliability. In addition, the ER effect provides the fast response needed for control of a complete semi-active suspension system which consists of several adjustable dampers/shock absorbers filled with ER fluid, power supplies to energize the fluid, sensors to provide feed-back, and a central command module.

The use of ER fluids in damper applications is generally known. However, there is a need for ER fluid dampers that provide an effective way of tuning the damping characteristics of the device to suit a particular application. Also, there is a need for an ER fluid damper package that is especially adaptable for use in an automobile suspension.

SUMMARY OF THE INVENTION

This invention relates to ER fluid dampers that provide an effective way of tuning the damping characteristics of the device to suit a particular application. Also, the dampers have a unique package arrangement making them especially adaptable for use in an automobile suspension.

In accordance with one aspect of the invention, the dampers include one or more annular ER fluid transfer ducts or paths in fluid communication with fluid chambers on opposite sides of the damper pistons. Each fluid transfer path has one or more contoured surfaces or bands along a portion of the length of one or both walls thereof providing one or more annular constricted working areas through which the ER fluid is forced when displaced by movement of the pistons. By selectively applying a voltage/electric field across the primary working areas, the flow resistance of the ER fluid passing through the primary working areas is increased which increases the damping force of the dampers.

In accordance with another aspect of the invention, the damping characteristics of the dampers may be tuned to suit a particular application by selecting the length or thickness of one or more contoured surfaces to obtain a desired length or width of the corresponding constricted working area through which the ER fluid passes.

In accordance with another aspect of the invention, the outer walls of the annular ER fluid transfer ducts or paths in the dampers are desirably exposed to ambient air to promote cooling of the ER fluid passing through such ducts.

In accordance with another aspect of the invention, a one way valve may be provided in the damper piston to allow a lower jounce force during the compression stroke than rebound force during the extension stroke without adjusting the voltage across the constricted working area or areas of the fluid transfer ducts. In a preferred form of the invention, this is accomplished using a flexible flapper which closes off a plurality of holes through the piston during the extension stroke and allows a portion of the ER fluid to pass through the holes during the compression stroke. The flapper is generally ring shaped including an inner peripheral portion that is clamped against the piston by a washer and nut arrangement and an outer peripheral portion that is free to flex into and out of sealing engagement with the holes during the extension and compression strokes. A radial flange on the washer overlies the outer peripheral portion of the flapper to limit the amount of flexing of the flapper away from the piston for extended flapper life.

In accordance with another aspect of the invention, a small bleed hole may be provided in the damper piston to diminish the friction-like effect of the ER fluid in the firm damping mode whenever there is a change in direction of the piston.

In accordance with another aspect of the invention, the dampers may include a single ended rod extending axially outwardly from one side of the piston, and a pressurized gas reservoir in fluid pressure communication with the ER fluid acted upon by the other side of the piston to take up the fluid volume displaced by the piston rod and thermal expansion. A floating piston is desirably used to isolate the pressurized gas reservoir from the ER fluid. Alternatively, a flexible diaphragm may be used for that purpose. Also, a reservoir of ER fluid may be provided between the piston chamber and gas reservoir, with an orifice in a partition separating the piston chamber from the ER fluid reservoir to produce a large pressure drop across the orifice during the compression stroke which reduces the amount of pressure needed in the gas reservoir. A one way valve in the partition provides for free flow of ER fluid from the ER fluid reservoir to the piston chamber during the extension stroke.

In accordance with another aspect of the invention, the gas reservoir may be replaced with a pressurized reserve tube of ER fluid to take up the ER fluid volume displaced by the piston rod and thermal expansion.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but several of the various ways in which the principles of the invention may be employed.

DETAILED DESCRIPTION OF THE PREFERRED EMBODIMENTS

Figure 1:
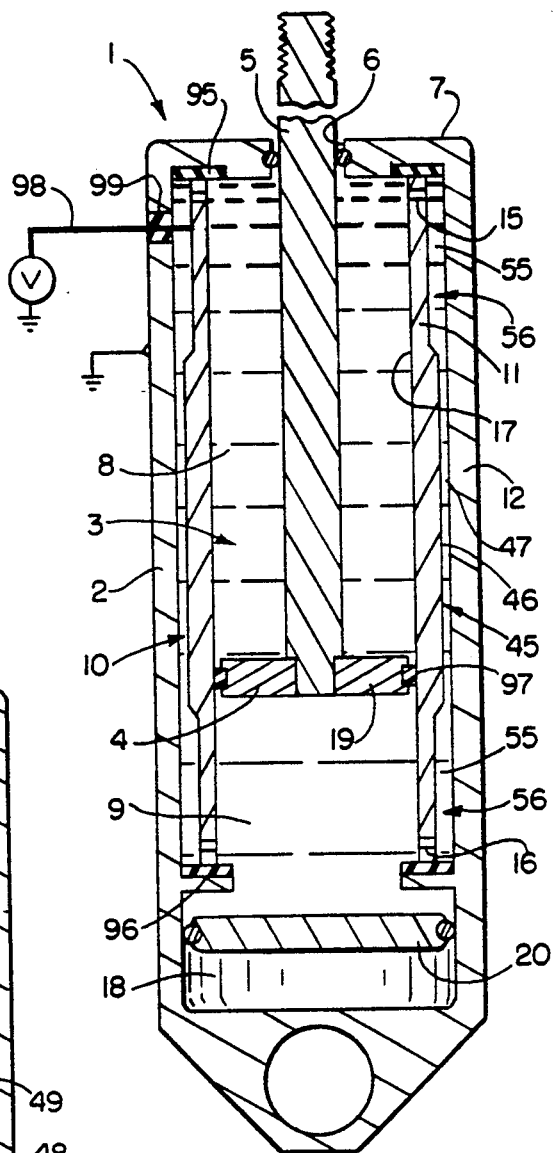
FIG. 1 is a schematic longitudinal section through one form of ER fluid damper in accordance with this invention which includes a single annular ER fluid transfer duct surrounding the piston chamber.

Referring now in detail to the drawings, and initially to FIG. 1, there is shown one form of adjustable damper 1 using ER fluid in accordance with the invention including a housing 2 containing a piston chamber 3 in which a piston 4 is axially slidably received. Relative movement of the piston 4 within the piston chamber 3 occurs when oppositely acting forces are applied to the damper housing 2 and piston rod 5 which extends outwardly from the piston through a sealed opening 6 in the rod end 7 of the damper housing.

The piston 4 divides the piston chamber 3 into two fluid chambers 8, 9 which are in fluid communication with each other through one or more annular fluid transfer ducts or paths surrounding the piston chamber 3. One such fluid transfer duct 10 is shown in FIG. 1, formed by providing an inner cylinder 11 radially inwardly spaced from an outer cylinder 12. Outer cylinder 12 is desirably an integral part of the exterior housing 2 to promote cooling of the ER fluids, which are relatively heat sensitive, when pushed through the duct as described hereafter. Radial holes or channels 15, 16 adjacent opposite ends of the inner cylinder 11 provide unobstructed fluid flow between the ends of the fluid transfer duct 10 and the respective fluid chambers 8, 9. Such radial holes or channels may be provided in the ends of the inner cylinder 11 as shown or in insulators 95, 96 at the ends of the inner cylinder 11 as desired to permit unobstructed fluid flow between the ends of the fluid transfer duct 10 and the respective fluid chambers 8, 9.

The inner wall 17 of the inner cylinder 11 desirably forms the piston chamber 3 in which the piston 4 is axially movable. Both the piston chamber 3 and fluid transfer duct 10 are filled with a suitable ER fluid which is pushed through the fluid transfer duct from one end of the piston chamber to the other by the motion of the piston. The fluid volume displaced by the piston rod 5 and by thermal expansion may be accommodated by a pressurized gas reservoir 18 in fluid pressure communication with the fluid chamber 9 acted upon by the side 19 of the piston 4 opposite the piston rod 5.

Figure 2:
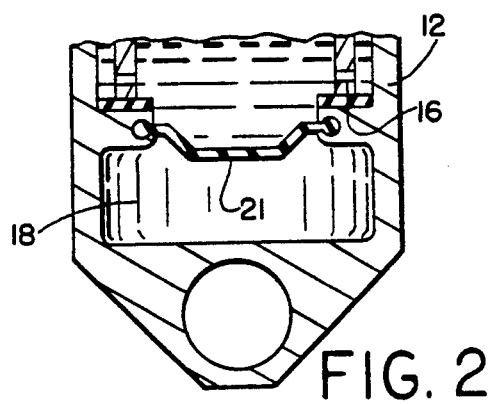
FIG. 2 is a fragmentary schematic longitudinal section through the head end which is opposite the rod end of an ER damper in accordance with this invention which may be substantially the same as that shown in FIG. 1 except for the use of a flexible diaphragm in place of the floating piston.

In the embodiment shown in FIG. 1, a floating piston 20 is provided between the piston chamber 9 and reservoir 18 for isolating the reservoir 18 from the ER fluid, whereas in FIG. 2 a flexible diaphragm 21 is substituted for the floating piston 20. However, the floating piston 20 is preferred over the flexible diaphragm 21 for increased durability. Also, a reservoir 22 of ER fluid may be provided between the fluid chamber 9 and gas reservoir 18, formed by providing a partition or wall 23 in the housing 2 between the fluid chamber 9 and gas reservoir 18 as schematically shown in FIG. 3.

Extending through the wall 23 of reservoir 22 is an orifice 24 which produces a large pressure drop across the wall during the compression stroke, thus reducing the amount of pressure needed in the gas reservoir 18 to prevent the ER fluid pressure in fluid chamber 8 from dropping below atmospheric. A one way valve 25 in the wall 23 provides for free flow of ER fluid from the reservoir 22 to the fluid chamber 9 during retraction of the piston 3.

Figure 3:
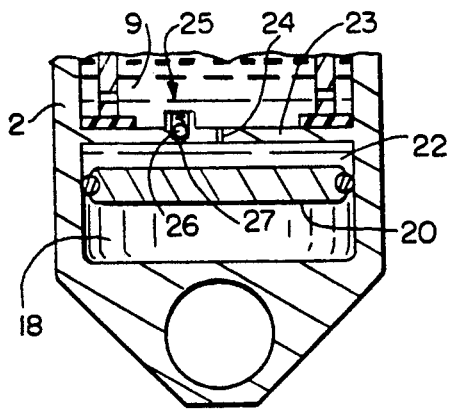
FIGS. 3 and 3A are fragmentary schematic longitudinal sections through the head end of other ER dampers in accordance with this invention which may be substantially the same as that shown in FIG. 1 (or FIG. 2) with the addition of a reserve reservoir of ER fluid between the piston chamber and gas reservoir.
Figure 3A:
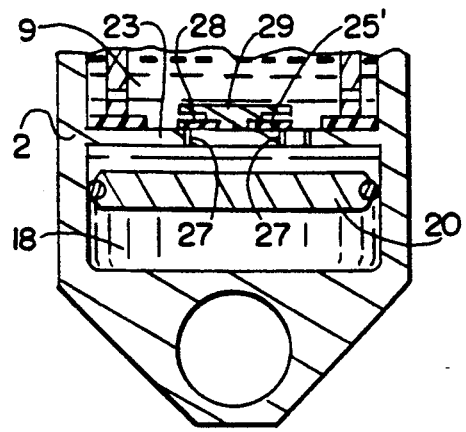

The one way valve 25 shown in FIG. 3 is a spring-loaded ball valve 26 mounted within a hole 27 in the reservoir wall 23, whereas the one way valve 25' shown in FIG. 3A is a flexible flapper 28, which may be made of a suitable metal, rubber or plastic. The inner periphery of the flapper 28 is retained in place against the axial inner side of the partition 23 by a retaining washer 29, leaving the outer periphery of the flapper free to flex into and out of sealing engagement with the partition 23 respectively to close and open one or more holes 27 therethrough. Otherwise, the damper shown in FIG. 3A is substantially the same as that shown in FIG. 3.

The gas reservoir 18 may be filled with an inert gas such as nitrogen, but is preferably filled with a gas such as sulphur hexafluoride that has a high breakdown potential to avoid arcing problems if the gas should leak into the ER fluid. The amount of gas charge must be greater than the maximum pressure drop expected across the piston 4 in order to prevent the ER fluid from cavitating during jounce (compression) and also prevent air from being drawn past the sealed opening 6 and into the piston chamber 3.

Figure 4:
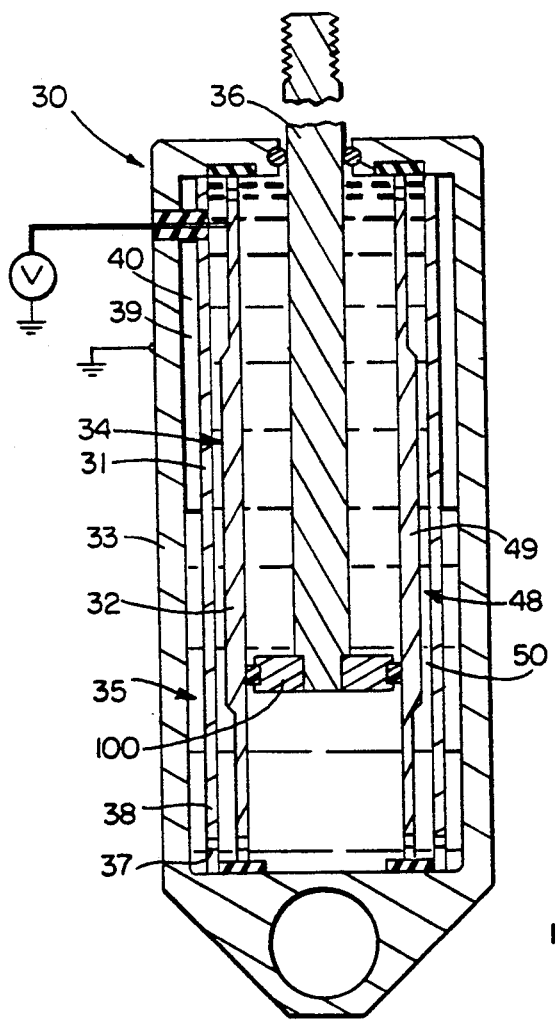
FIGS. 4 and 4A are schematic longitudinal sections through still other ER dampers in accordance with this invention which include a pressurized reserve chamber of ER fluid instead of a separate pressurized gas reservoir of any one of the dampers of FIGS. 1-3 and 3A.

An alternative to the floating piston 20 and flexible diaphragm 22 type accumulators shown in FIGS. 1 and 2 is to contain the gas charge in a reserve chamber of ER fluid. FIG. 4 shows one such form of damper 30 in accordance with the invention in which an intermediate cylinder 31 is mounted between the inner and outer cylinders 32, 33 thus dividing the space between the inner and outer cylinders 32, 33 into an ER fluid transfer duct 34 (between the inner and intermediate cylinders 32, 31) and a reserve chamber 35 (between the intermediate and outer cylinders 31, 33). The reserve chamber 35 accommodates the fluid volume displaced by the piston rod 36 and by thermal expansion through openings 37 adjacent one end 38 of the intermediate cylinder 31 which communicate with the fluid transfer duct 34. The ER fluid within the reserve chamber 35 is maintained under pressure by a gas charge 39 in the other, closed end 40 of the chamber.

Figure 4A:
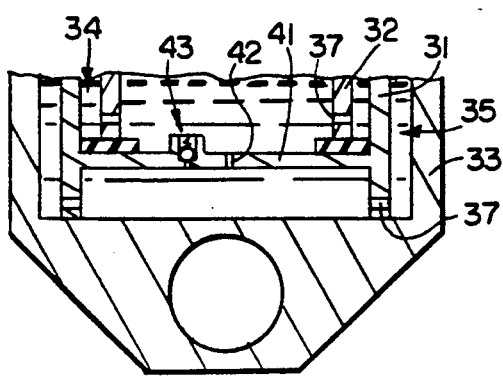

If desired, a partition 41 may be provided between the head end of the piston chamber and the reserve chamber 35 of ER fluid, with an orifice 42 and one way valve 43 in the partition as schematically shown in FIG. 4A. The orifice 42 provides a large pressure drop across the partition 41 during the compression stroke thus reducing the amount of gas charge needed in the closed end of the reserve chamber 35 to prevent the ER fluid pressure in the rod end of the piston chamber from dropping below atmospheric. The one way valve 43 provides for free flow of ER fluid from the reserve chamber 35 through openings 37 in the intermediate cylinder 31 and one way valve 43 to the head end of the piston chamber during retraction of the piston.

One or both walls of the fluid transfer duct are contoured along a portion of the length thereof to provide a relatively narrow gap which constitutes the primary working area for the ER fluid when voltage is applied across the duct to increase its resistance to flow through the primary working area as described hereafter. In the damper design 1 shown in FIG. 1, the primary working area 45 in the duct 10 is formed by a single band 46 on the inner wall of the duct which defines with the outer wall of the duct a relatively long, narrow gap 47 therebetween. In like manner, in the damper design 30 shown in FIG. 4, the primary working area 48 in the duct 34 is formed by a single band 49 on the inner wall of the duct which defines with the outer wall of the duct a relatively long, narrow gap 50 therebetween.

By way of example, the damper 1 shown in FIG. 1 may have an ER fluid duct 10 with an effective length between the openings 15, 16 at the ends thereof of approximately 7 inches and a gap 55 in the non-working areas 56 having a width of approximately 0.060 inch. Intermediate the length of the duct 10 is the band 46 which has a length of approximately 5 inches and a height of approximately 0.040 inch, leaving a gap 47 in the primary working area 45 having a length of approximately 5 inches and a width of approximately 0.020 inch. However, how long and how wide the gap 47 is in the primary working area 45 are variables in tuning the duct geometry which may be selected to tailor the damping characteristics of the damper to suit a particular application. Also, while the band 46 is shown in FIG. 1 intermediate the length of the duct, the band may be located anywhere along such length as desired.

Figure 5:
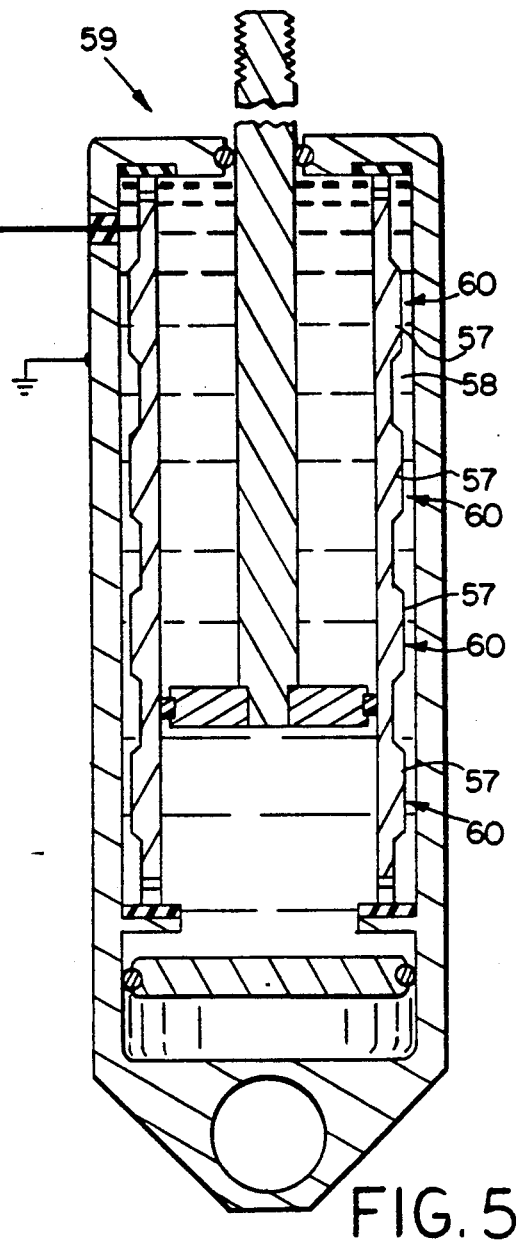
FIG. 5 is a schematic longitudinal section through yet another form of ER damper in accordance with this invention including modified duct walls.
Figures 6, 6A, 8, 9, 10:
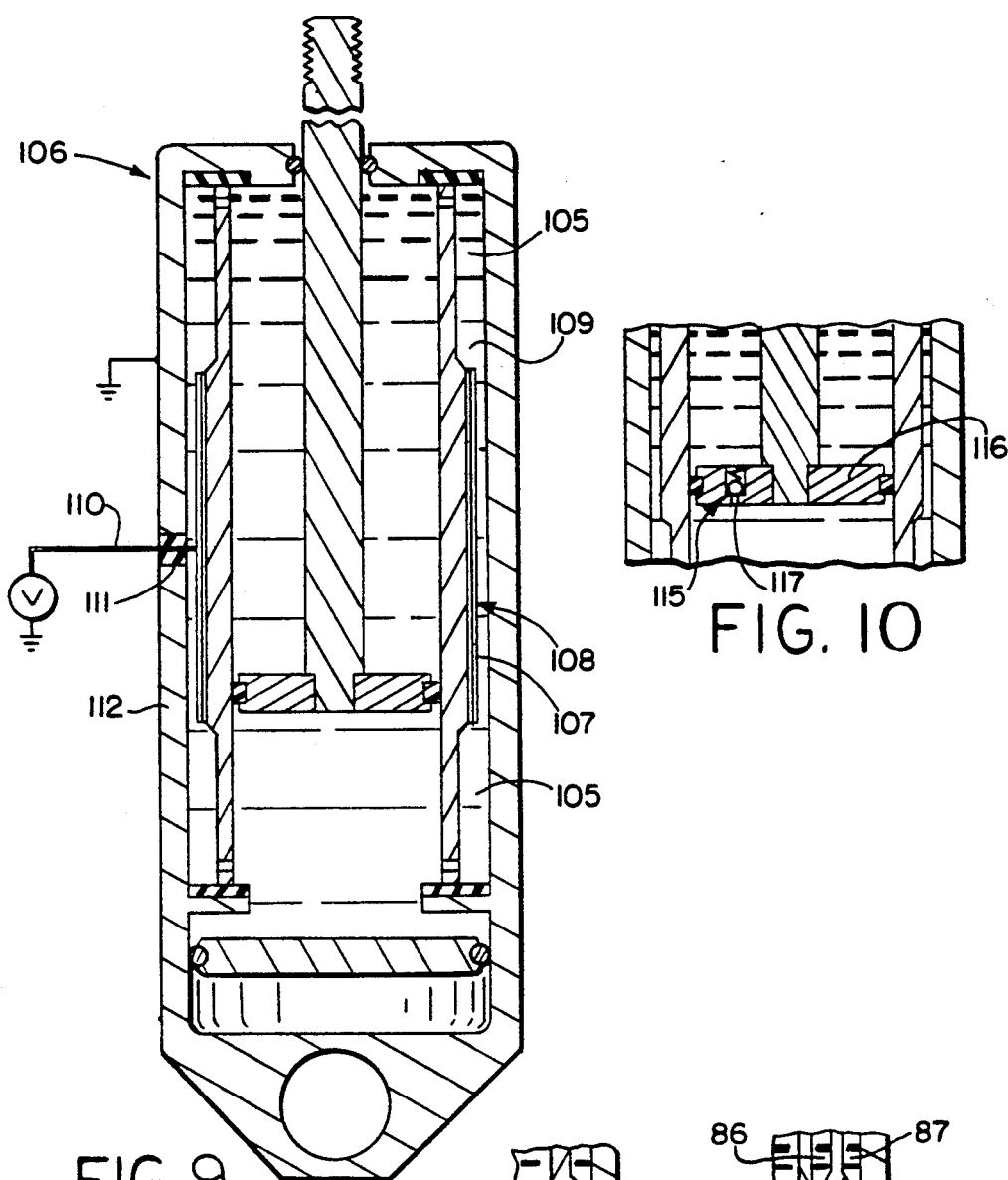
FIGS. 6 and 6A are fragmentary longitudinal sections through the duct walls of other forms of ER dampers in accordance with this invention showing different duct wall configurations.
FIG. 8 is a fragmentary schematic longitudinal section through the duct walls of another form of ER damper in accordance with the invention including a plurality of ER fluid transfer ducts, similar to FIG. 7, but with a different duct wall configuration.
FIG. 9 is a schematic longitudinal section through still another form of ER damper in accordance with this invention which includes an insulated electrode in the ER fluid transfer duct.
FIG. 10 is a fragmentary longitudinal section through yet another form of ER damper in accordance with this invention which may be substantially the same as any of the ER dampers shown in FIGS. 1-9 and including one or more one way valves in the damper piston.

Likewise, a plurality of axially spaced apart bands 57 may be provided along the length of the duct 58 of an ER damper 59 as schematically shown in FIG. 5 to form a pluraltiy of primary working areas 60 having a combined length equal to or different than the single primary working areas shown in FIGS. 1 and 4 to obtain the same or different damping characteristics as desired. Also, one or more bands 61 may be provided on the outer wall of the ER fluid transfer duct 62 as shown in FIG. 6 rather than on the inner wall of the ducts as shown in FIGS. 1, 4 and 5. Alternatively, one or more bands 63 and 64 may be provided on both the outer and inner walls of an ER fluid transfer duct 65, with the bands axially spaced or axially aligned as schematically shown in FIG. 6A.

Figure 7:
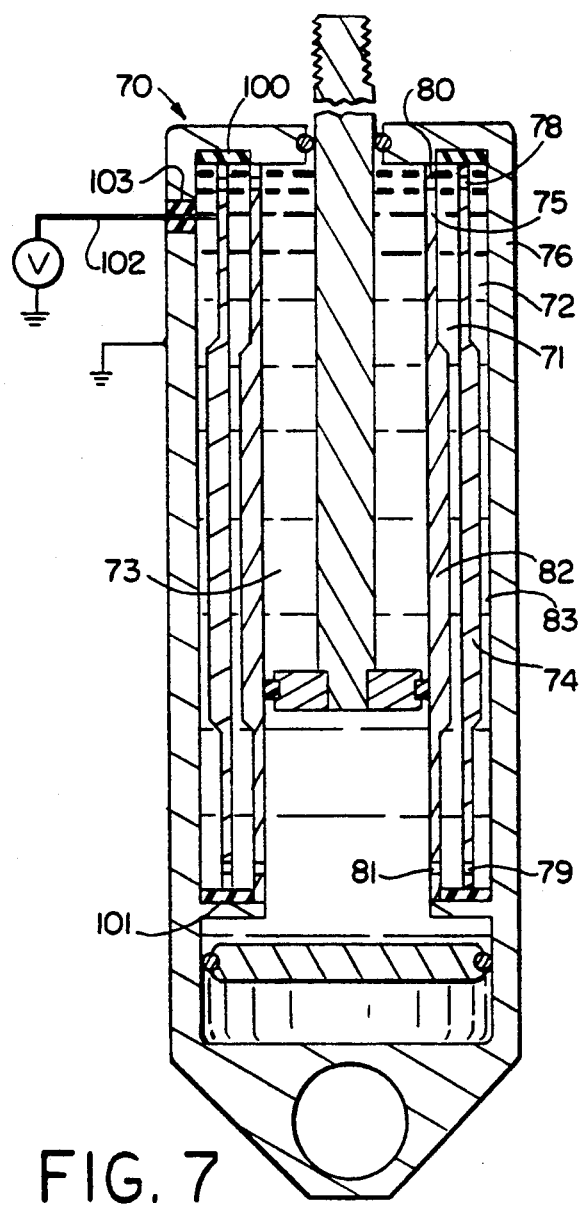
FIG. 7 is a schematic longitudinal section through still another form of ER damper in accordance with this invention which includes a plurality of ER fluid transfer ducts surrounding the piston chamber.

More than one fluid transfer duct may also be provided in the ER fluid damper to increase the cross sectional flow area for the ER fluid for a given length of damper, with contoured surfaces along portions of the lengths of the ducts to tune the damping force. One such damper 70 is shown in FIG. 7 which includes two ER fluid transfer ducts 71 and 72 surrounding the piston chamber 73 formed as by providing an intermediate cylinder 74 between the inner and outer cylinders 75 and 76, with openings 78 and 79 at either end of the intermediate cylinder 74 similar to the openings 80 and 81 at either end of the inner cylinder 75. In FIG. 7, a single band 82 and 83 is provided on the inner wall of both ducts 71 and 72. However, all of the bands 84 and 85 for two ducts 86 and 87 may be provided on opposite walls of an intermediate cylinder 88 between inner and outer cylinders 89 and 90 as schematically shown in FIG. 8. Alternatively, one or more bands may be provided on one or both walls of both ducts in the manner previously described. The size of the bands in each duct may be the same or different as desired.

The length and height of each of the bands or other duct wall contours may be varied as desired to provide gaps of different lengths and widths in the primary working areas to achieve the desired damping characteristics. In the various figures, the bands are shown as having uniform heights throughout their lengths except at their ends which are desirably sloped at an angle away from each other to eliminate any sharp corners (having included angles for example of 90° or less) which could cause turbulent flow through the ducts and a concentration of the electric field at the corners possibly causing arcing when a voltage is applied across the primary working areas as described hereafter. However, the bands could also be of varying heights along their lengths for different applications if desired.

In the damper 1 shown in FIG. 1, the inner cylinder 11 is electrically insulated from the outer cylinder 12 by providing insulator rings 95, 96 between the ends of the inner cylinder 11 and the adjacent housing support surfaces. Also, the inner cylinder 11 is electrically insulated from the piston 4 by a plastic bearing 97 around the outer diameter of the piston which forms a fluid seal with the inner diameter of the inner cylinder 11. A voltage source V is applied across the annular duct 10 by connecting a lead 98 from the voltage source directly to the inner cylinder 11 through an insulator 99 in the outer cylinder 12 and by grounding the outer cylinder as shown.

The inner cylinders of the dampers shown in FIGS. 4, 5 and 9 may be similarly electrically insulated from the outer cylinders (and in the case of FIG. 4, also from the intermediate cylinder) as well as from the pistons. Also, the voltage source may be similarly applied to the inner cylinders through suitable insulators in the outer cylinders (and in the case of FIG. 4, also in the intermediate cylinder), and the outer cylinders may be suitably grounded.

In the damper 70 arrangement shown in FIG. 7, which includes two ER fluid transfer conduits 71 and 72, the inner cylinder 75 is electrically connected to the outer cylinder 76, which is in turn connected to ground. The intermediate cylinder 74, on the other hand, is electrically insulated from both the inner and outer cylinders 75 and 76 by placing insulator rings 100 and 101 at the ends of the intermediate cylinder, and a voltage source is connected to the intermediate cylinder 74 by a lead 102 extending from the voltage source to the intermediate cylinder through an insulator 103 in the outer cylinder 76.

When a voltage is applied across each of the annular ducts, an electric field is created perpendicular to the fluid flow, which causes the ER fluid to substantially instantly increase its resistance to flow through the primary working areas of the ducts. This causes an increase in pressure drop across each of the damper pistons which increases the force required to move the pistons.

When no voltage is applied across the ducts, damping is due entirely to the viscosity of the ER fluid and is proportional to its flow rate through the ducts. However, when a voltage is applied across the primary working areas of the ducts, the field-induced stress of the ER fluid substantially instantaneously increases the resistance to flow of the ER fluid through such primary working areas and thus the damping force required to move the pistons. This damping force can easily be adjusted to different values by changing the voltage applied to the ER fluid.

In the various damper designs previously described, the applied voltage also produces some electric field across the non-working areas of the ducts which causes some additional resistance to flow in the non-working areas due to the ER effect. However, this effect can be minimized by making the width of the gaps in the primary working areas substantially less than that in the non-working areas, for example, one third the width of the gaps in the non-working areas or less. Moreover, the resistance to flow in the non-working areas 104 of a fluid transfer duct 105 of an ER damper 106 due to ER effect can be substantially completely eliminated by providing an insulated electrode 107 only in the primary working area 108 of the duct to substantially confine the electric field to the primary working area when a voltage is applied to the insulated electrode by means of a lead 110 extending through an insulator 111 in the outer cylinder 112 of the duct as schematically shown in FIG. 9.

When the dampers are used in a vehicle suspension system design, it is often desirable to have higher damping force in rebound (extension) than in jounce (compression). To decrease the jounce damping force relative to rebound without having to adjust the voltage, a one way valve 115 may be included in the damper piston 116 as schematically shown in FIG. 10. During jounce, the valve 115 allows some fluid flow through an orifice 117 in the piston, thereby reducing the total resistance to flow and reducing the pressure drop across the piston.

The construction of valves for ER fluid dampers as opposed to conventional hydraulic fluid dampers is complicated by the presence of fine particles that are generally dispersed in ER fluid.

Figure 11:
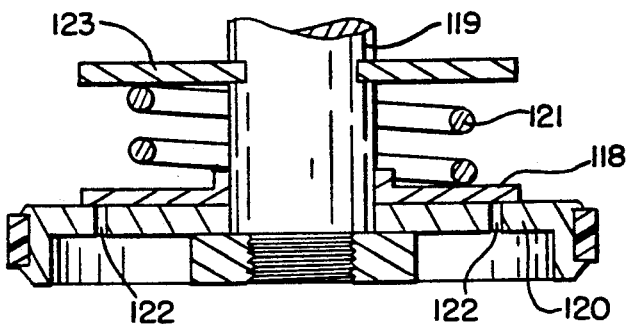
FIGS. 11, 12 and 13 are enlarged fragmentary longitudinal sections through other forms of damper pistons in accordance with this invention having one or more one way valves therein which may be incorporated in any of the ER dampers shown in FIGS. 1-10.

If required by a particular application, the one way valve 115 may be spring loaded to provide pressure relief at a predetermined desired level of pressure drop across the piston. The valve 115 shown in FIG. 10 is a spring loaded ball valve, whereas FIG. 11 shows a spring loaded washer 118 as the one way valve. The valve washer 118 is slidably received on the piston rod 119 and is urged into engagement with the extension side of the piston 120 by means of a coil spring 121 to close off one or more holes 122 through the piston during the extension stroke. During the compression stroke, the valve washer 118 is forced away from the piston by the pressure in the head end of the piston chamber, allowing a portion of the fluid to pass through the holes 122 to the rod end of the piston chamber. A retaining ring 123 retains the coil spring 121 in place on the piston rod.

Figure 12:
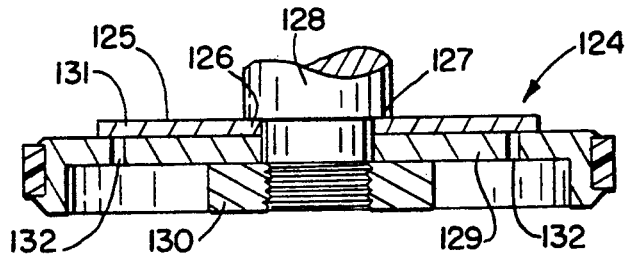

FIG. 12 shows another form of one way piston valve 124 which comprises a flexible metal flapper 125 having its inner periphery 126 pressed up against a shoulder 127 on the piston rod 128 by the piston 129 and secured in place by a nut 130 threaded onto the end of the piston rod. The outer periphery 131 of the flapper 125 overlies one or more holes 132 in the piston and is free to flex away from the holes during the compression stroke.

Figure 13:
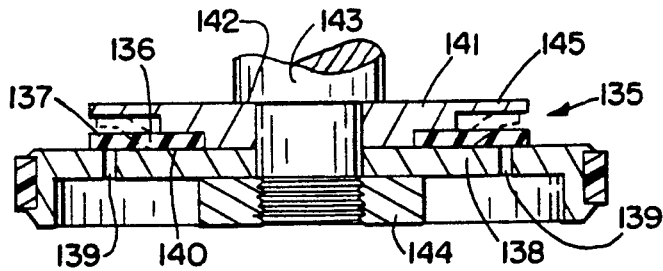

FIG. 13 shows still another piston valve 135 in the form of a flexible flapper 136 having an outer periphery 137 which moves into engagement with the piston 138 to close off one or more holes 139 therethrough during the extension stroke as shown in solid lines and flexes away from the piston to allow a portion of the fluid to pass through the holes during the compression stroke as shown in phantom lines. The inner periphery 140 of the flapper 136 is clamped against the extension side of the piston by a washer 141 pressed up against a shoulder 142 on the piston rod 143 and held in place by a nut 144 threaded onto the end of the piston rod. The outer periphery 137 of the flapper 136 overlies the holes 139 in the piston and is free to flex away from the holes during the compression stroke. A radial flange 145 on the washer 141 overlies the outer periphery of the flapper in axially spaced relation from the piston to limit the amount of flexing of the flapper away from the piston for extended flapper life.

During movement of the damper pistons in the "firm" mode, which occurs when a voltage is applied across the ER ducts, an abrupt change of force occurs whenever there is a change in the direction of movement of the pistons. This characteristic is typical of a friction damper and is considered undesirable for a vehicle suspension system since it contributes to harshness. The friction-like behavior is due to the ER fluid exhibiting, in the presence of an electric field, an additional stress component that may be modeled as a yield stress. This problem can be alleviated by continuously adjusting the electric field using an appropriate controller. However, this adds complexity to the system controller. Likewise, this problem can be alleviated by installing rubber bushings at the damper attachment points to absorb harshness. However, the spring rates of the bushings add a delay to the system response.

Figure 14:
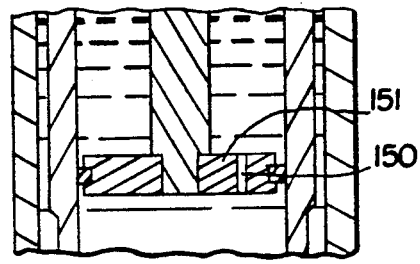
FIG. 14 is a fragmentary schematic longitudinal section through another form of ER damper in accordance with this invention which may be substantially the same as any of the ER dampers shown in FIGS. 1-9 and including a bleed hole through the damper piston.

A solution to the problem which requires no moving parts or additional hardware and does not add any delay to the system response is to provide a small bleed hole 150 in the damper piston 151 as schematically shown in FIG. 14 to diminish the friction-like effect of the ER fluid whenever there is a change in direction of the piston. Such a bleed hole may be provided in the piston in addition to or in lieu of the piston valves shown in FIGS. 10-13.

Figure 15:
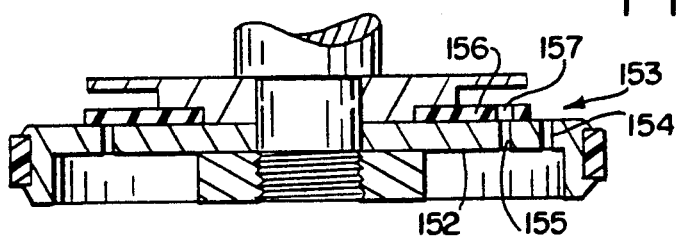
FIG. 15 is an enlarged fragmentary longitudinal section through another form of damper piston in accordance with the invention having one or more one way valves and bleed holes through the piston which may be incorporated in any of the ER dampers shown in FIGS. 1-10.

FIG. 15 shows one form of damper piston 152 in accordance with this invention including both a one way valve 153, which may be similar to the one way valve 135 shown in FIG. 13, and a bleed hole 154 and/or 155 in the piston. The bleed hole 154 is shown located radially outwardly of the flexible flapper 156, whereas the bleed hole 155 is shown in axial alignment with a hole 157 through the flapper 156. In either case the bleed hole 154 and/or 155 in the damper piston 152 will remain open at all times for diminishing the friction-like effect of the ER fluid regardless of the change of direction of the piston. A disadvantage to providing such a bleed hole is that the maximum damping force of the damper is reduced.

Although the invention has been shown and described with respect to certain preferred embodiments, it is obvious that equivalent alterations and modifications will occur to others skilled in the art upon the reading and understanding of the specification. The present invention includes all such equivalent alterations and modifications, and is limited only by the scope of the claims.

What is claimed is:

1. A damper for damping a vibrating body comprising a housing containing a piston chamber, a piston axially movable within said piston chamber, said piston dividing said piston chamber into two fluid chambers, annular fluid transfer duct means surrounding said piston chamber providing fluid communication between said fluid chambers on opposite sides of said piston, said duct means including spaced apart annular walls, said fluid chambers and said duct means being filled with an electroheological (ER) fluid whose flow resistance increases when an electric field is applied thereto, said duct means having annular protrusion means on at least one of said walls extending for a portion of the length of said duct means providing an annular constricted area in said duct means through which the ER fluid is forced during movement of said piston with said piston chamber, and means for applying an electric field across said constricted area to increase the flow resistance of the ER fluid passing through said constricted area.

2. The damper of claim 1 wherein there are a plurality of said annular protrusion means on at least one of said walls of said duct means extending for a portion of the length of said duct means.

3. The damper of claim 1 wherein said annular protrusion means is on each of said walls of said duct means extending for a portion of the length of said duct means.

4. The damper of claim 1 wherein said annular protrusion means comprises at least one band on at least one of said walls of said duct means extending for a portion of the length of said duct means.

5. The damper of claim 1 wherein said annular protrusion means comprises a plurality of axially spaced apart bands on at least one of said walls of said duct means extending for a portion of the length of said duct means.

6. The damper of claim 1 wherein said duct means has an outer wall exposed to ambient air to promote cooling of the ER fluid passing through said duct means.

7. The damper of claim 1 further comprising valve means in said piston for permitting a portion of the ER fluid displaced during a compression stroke of said piston to pass through said piston.

8. The damper of claim 7 wherein said valve means comprises passage means through said piston, and flexible flapper valve means on an extension side of said piston movable into and out of fluid sealing engagement with said passage means.

9. The damper of claim 8 wherein said valve means further comprises washer means for retaining said flapper valve means on said piston, said washer means having a first recess for clamping receipt of an inner peripheral portion of said flapper valve means, and a second recess having a greater depth than said first recess overlying an outer peripheral portion of said flapper valve means to permit limited flexing of said flapper valve means.

10. The damper of claim 7 wherein said valve means comprises passage means through said piston containing a spring-loaded check valve.

11. The damper of claim 7 wherein said valve means comprises passage means through said piston, and washer means on an extension side of said piston movable into and out of sealing engagement with said passage means.

12. The damper of claim 1 further comprising bleed hole means through said piston for diminishing the friction-like effect of the ER fluid whenever there is a change in direction of the movement of said piston.

13. The damper of claim 12 further comprising valve means in said piston for permitting a portion of the ER fluid displaced during a compression stroke of said piston to pass through said valve means.

14. A damper for damping a vibrating body comprising an outer cylinder, an inner cylinder radially inwardly spaced from said outer cylinder defining an annular fluid transfer duct therebetween, a piston axially movable within said inner cylinder, said piston dividing said inner cylinder into two fluid chambers having fluid communication with said fluid transfer duct through passage means adjacent opposite ends of said inner cylinder, said fluid chambers and said fluid transfer duct being filled with an electrorheological (ER) fluid whose flow resistance increases when an electric field is applied thereto, one of the walls of said cylinders which define said fluid transfer duct having annular protrusion means along a portion of the length of said one wall providing an annular constricted area in said fluid transfer path between said protrusion means and another wall of said cylinders through which the ER fluid passes when displaced by said piston, and means for applying an electric field across said constricted area to increase the flow resistance of the ER fluid passing through said constricted area.

15. The damper of claim 14 wherein the spacing between said inner and outer cylinders at said constricted area is substantially less than the spacing between said inner and outer cylinders along the remaining length of said duct means.

16. The damper of claim 14 wherein said protrusion means is on a radial outer wall of said inner cylinder.

17. The damper of claim 14 wherein the width of said duct means is substantially uniform throughout its length except at said constricted area.

18. The damper of claim 17 wherein opposite ends of said constricted area slope away from each other so there are no sharp corners at said opposite ends.

19. A damper for damping a vibrating body comprising outer cylinder means, inner cylinder means radially inwardly spaced from said outer cylinder means, intermediate cylinder means between said inner and outer cylinder means, said intermediate cylinder means defining with each of said inner and outer cylinder means a pair of radially spaced annular fluid transfer duct means, a piston axially movable within said inner cylinder means, said piston dividing the interior of said inner cylinder means into two fluid chambers having fluid communication with each of said duct means through passage means adjacent opposite ends of said inner and intermediate cylinder means, said fluid chambers and said duct means being filled with an electrorheological (ER) fluid whose flow resistance increases when an electric field is applied thereto, said duct means having wall means with contoured surface means along a portion of the length of said wall means providing annular constricted areas in said duct means through which the ER fluid passes when displaced by said piston, and means for applying an electric field across said constricted areas to increase the flow resistance of the ER fluid passing through said constricted areas.

20. A damper for damping a vibrating body comprising a housing containing a piston chamber, a piston axially movable within said piston chamber, said piston dividing said piston chamber into two fluid chambers, annular fluid transfer duct means surrounding said piston chamber providing fluid communication between said fluid chambers on opposite sides of said piston, said fluid chambers and said duct means being filled with an electrorheological (ER) fluid whose flow resistance increases when an electric field is applied thereto, said duct means having contoured surface means along a portion of the length of said duct means providing an annular constricted area in said duct means through which the ER fluid is forced during movement of said piston within said piston chamber, and means for applying an electric field across said constricted area to increase the flow resistance of the ER fluid passing through said constricted area, said duct means including spaced apart annular walls extending substantially the full length of said piston chamber, and said contoured surface means comprising annular protrusion means on at least one of said walls of said duct means extending for a portion of the length of said duct means.

21. The damper of claim 20 wherein said housing includes inner and outer cylinders in radially spaced relation defining said duct means therebetween, said inner cylinder having an inner wall defining said piston chamber and an outer wall comprising one of said walls of said duct means, said annular protrusion means being integral with said outer wall of said inner cylinder.

22. The damper of claim 21 wherein the radial spacing between said inner and outer cylinders is substantially the same throughout the length of said cylinders except for said constricted area where the radial spacing is less.

23. The damper of claim 21 wherein said inner and outer cylinders are electrically conductive and electrically insulated from each other, and said means for applying an electric field across said constricted area comprises a voltage source connected across said cylinders.

24. A damper for damping a vibrating body comprising a housing containing a piston chamber, a piston axially movable within said piston chamber, said piston dividing said piston chamber into two fluid chambers, annular fluid transfer duct means surrounding said piston chamber providing fluid communication between said fluid chambers on opposite sides of said piston, said fluid chambers and said duct means being filled with an electrorheological (ER) fluid whose flow resistance increases when an electric field is applied thereto, said duct means having contoured surface means along a portion of the length of said duct means providing an annular constricted area in said duct means through which the ER fluid is forced during movement of said piston within said piston chamber, and means for applying an electric field across said constricted area to increase the flow resistance of the ER fluid passing through said constricted area, said means for applying an electric field across said constricted area comprising electrode means on one wall of said duct means extending substantially the full length of said contoured surface means, said electrode means being electrically insulated from said duct means, and a voltage source connected to said electrode means, said duct means having another wall opposite said one wall which is electrically conductive and connected to ground.

25. A damper for damping a vibrating body comprising a housing containing a piston chamber, a piston axially movable within said piston chamber, said piston dividing said piston chamber into two fluid chambers, annular fluid transfer duct means surrounding said piston chamber providing fluid communication between said fluid chambers on opposite sides of said piston, said fluid chambers and said duct means being filled with an electrorheological (ER) fluid whose flow resistance increases when an electric field is applied thereto, said duct means having contoured surface means along a portion of the length of said duct means providing an annular constricted area in said duct means through which the ER fluid is forced during movement of said piston within said piston chamber, means for applying an electric field across said constricted area to increase the flow resistance of the ER fluid passing through said constricted area, a single ended piston rod extending from one side of said piston through a sealed opening in an end of said housing, and a pressurized gas reservoir in said housing in fluid pressure communication with the ER fluid in the fluid chamber acted upon by another side of said piston opposite said one side.

26. The damper of claim 25 wherein said gas reservoir is filled with a gas that has a high-break down potential to avoid arcing in the event that said gas should leak into the ER fluid.

27. The damper of claim 25 wherein said gas reservoir is filled with an inert gas.

28. The damper of claim 25 further comprising a floating piston in said gas reservoir for isolating said gas reservoir from the ER fluid.

29. The damper of claim 25 further comprising flexible diaphragm means for isolating said gas reservoir from the ER fluid.

30. The damper of claim 25 further comprising a reservoir of ER fluid between said piston chamber and said gas reservoir, wall means between said piston chamber and said reservoir of ER fluid containing orifice means providing a pressure drop across said orifice means during movement of said piston toward said reservoir of ER fluid to reduce the amount of gas pressure needed to prevent the ER fluid pressure acting on said one side of said piston from dropping below atmospheric, and valve means providing for free flow of ER fluid from said reservoir of ER fluid to said piston chamber during movement of said piston away from said reservoir of ER fluid.

31. The damper of claim 25 further comprising annular chamber means surrounding said duct means, said annular chamber means having one end in fluid communication with said duct means, said annular chamber means containing a reserve supply of ER fluid acted on by the pressurized gas in said gas reservoir.

32. A damper for damping a vibrating body comprising a housing containing a piston chamber, a piston axially movable within said piston chamber, said piston dividing said piston chamber into two fluid chambers, a plurality of radially spaced annular fluid transfer duct means surrounding said piston chamber providing fluid communication between said fluid chambers on opposite sides of said piston, said fluid chambers and said duct means being filled with an electrorheological (ER) fluid whose flow resistance increases when an electric field is applied thereto, each of said duct means having contoured surface means along a portion of the length of said duct means providing an annular constricted area in each of said duct means through which the ER fluid is forced during movement of said piston within said piston chamber, and means for applying an electric field across said constricted area in each of said duct means to increase the flow resistance of the ER fluid passing through each said constricted area.

33. A damper for damping a vibrating body comprising a housing containing a piston chamber, a piston axially movable within said piston chamber, said piston dividing said piston chamber into two fluid chambers, annular fluid transfer duct means surrounding said piston chamber providing fluid communication between said fluid chambers on opposite sides of said piston, said fluid chambers and said duct means being filled with an electrorheological (ER) fluid whose flow resistance increases when an electric field is applied thereto, said duct means having an annular primary working area for the ER fluid extending over a portion of the length of said duct means and an annular non-working area extending over another portion of the length of said duct means, said primary working area and said non-working area providing different width annular flow paths along the length of said duct means through which the ER fluid is forced during movement of said piston within said piston chamber, the width of the annular flow path defined by said primary working area being substantially less than the width of the annular flow path defined by said non-working area, and means for applying an electric field across said primary working area to increase the flow resistance of the ER fluid passing through the annular flow path defined by said primary working area.

34. The damper of claim 33 wherein said housing comprises an inner cylinder containing said piston chamber, and an outer cylinder radially outwardly spaced from said inner cylinder defining said duct means therebetween, said primary working area and said non-working area extending over different portions of the length of said duct means between said inner and outer cylinders.

35. A damper for damping a vibrating body comprising a housing containing a piston chamber, a piston axially movable within said piston chamber, said piston dividing said piston chamber into two fluid chambers, fluid transfer duct means exteriorly of said piston chamber providing fluid communication between said fluid chambers on opposite sides of said piston, said fluid chambers and said duct means being filled with an electrorheological (ER) fluid whose flow resistance increases when an electric field is applied thereto, said duct means including a constricted area through which the ER fluid is forced during movement of said piston within said piston chamber, means for applying an electric field across said constricted area to increase the flow resistance of the ER fluid passing through said constricted area, and bleed hole means through said piston providing restricted flow of the ER fluid in either direction through said piston whenever there is a change in direction of the movement of said piston from a compression stroke to an extension stroke and vice versa to diminish a friction-like effect on the ER fluid which occurs during such change in direction of the movement of said piston.

36. The damper of claim 35 further comprising one-way valve means in said piston for permitting a portion of the ER fluid displaced during such compression stroke of said piston to pass through said valve means only during such compression stroke.

* * * * *